(12) United States Patent
Wei

(10) Patent No.: US 10,088,683 B2
(45) Date of Patent: Oct. 2, 2018

(54) HEAD WORN DISPLAYING DEVICE EMPLOYING MOBILE PHONE

(71) Applicant: Tapuyihai (Shanghai) Intelligent Technology Co., LTD., Shanghai (CN)

(72) Inventor: Rongjie Wei, Kaili (CN)

(73) Assignee: TAPUYIHAI (SHANGHAI) INTELLIGENT TECHNOLOGY CO., LTD., Shanghai (CN)

( * ) Notice: Subject to any disclaimer, the term of this patent is extended or adjusted under 35 U.S.C. 154(b) by 276 days.

(21) Appl. No.: 14/921,022

(22) Filed: Oct. 23, 2015

(65) Prior Publication Data

US 2016/0116742 A1 Apr. 28, 2016

Related U.S. Application Data

(60) Provisional application No. 62/068,056, filed on Oct. 24, 2014.

(51) Int. Cl.
*G09G 5/00* (2006.01)
*G02B 27/01* (2006.01)
(Continued)

(52) U.S. Cl.
CPC ..... *G02B 27/0172* (2013.01); *G02B 27/0176* (2013.01); *G06F 1/163* (2013.01); *G06F 3/011* (2013.01); *G06F 3/012* (2013.01); *G02B 2027/011* (2013.01); *G02B 2027/013* (2013.01); *G02B 2027/0154* (2013.01); *G02B 2027/0161* (2013.01); *H04R 2460/13* (2013.01); *H04R 2499/15* (2013.01)

(58) Field of Classification Search
CPC ............ G02B 27/0172; G02B 27/0176; G02B 2027/013; G02B 2027/0154; G02B 2027/011; G02B 2027/0161; G06F 3/011; H04R 2460/13; H04R 2460/15
See application file for complete search history.

(56) References Cited

U.S. PATENT DOCUMENTS

2004/0070839 A1* 4/2004 Yagi ................... G02B 27/0172
                                                                      359/630
2005/0033571 A1* 2/2005 Huang ................... G10L 15/20
                                                                      704/231
(Continued)

*Primary Examiner* — Nelson Rosario
*Assistant Examiner* — Andrew Lee

(57) ABSTRACT

A head worn displaying device of the disclosure includes an optical reflective lens, a display screen and a cover. The optical lens and the display screen are mounted under the cover, and the cover may be similar to a hat tongue located ahead of the forehead of a user. The display screen can be integrated in a mobile phone, and a holder such as a clamper set is used to clamp the mobile phone. The angle of the optical lens can be adjusted, for example, by using a sliding groove and a magnetic hinge which are located at a front end of the hat tongue. The magnetic hinge slides in the sliding groove to adjust a distance between the display screen and the optical lens. The light rays of the display screen will be reflected by the optical lens to form virtual magnified images with reduced distortions for both eyes at the same time, and the optical lens optically combines the reflected virtual images with and external environmental light rays transmitted through the optical lens to form the augmented reality for the eyes.

19 Claims, 9 Drawing Sheets

(51) Int. Cl.
*G06F 3/01* (2006.01)
*G06F 1/16* (2006.01)

(56) References Cited

U.S. PATENT DOCUMENTS

| | | | |
|---|---|---|---|
| 2005/0057439 A1* | 3/2005 | Hata | A42B 1/245 345/8 |
| 2006/0176242 A1* | 8/2006 | Jaramaz | A61B 5/0059 345/7 |
| 2009/0147148 A1* | 6/2009 | Morikawa | A61B 5/16 348/734 |
| 2012/0133893 A1* | 5/2012 | Choi | G03B 35/26 353/8 |
| 2013/0141527 A1* | 6/2013 | Shimizu | G02B 5/32 348/40 |
| 2014/0152531 A1* | 6/2014 | Murray | G06F 1/1632 345/8 |
| 2014/0197396 A1* | 7/2014 | Madigan | H01L 51/0005 257/40 |
| 2014/0266990 A1* | 9/2014 | Makino | G02B 27/017 345/8 |
| 2015/0072555 A1* | 3/2015 | Riddiford | F16M 11/041 439/575 |

* cited by examiner

HEAD WORN DISPLAYING DEVICE EMPLOYING MOBILE PHONE

CROSS-REFERENCE TO RELATED APPLICATIONS

This application is a continuation of and claims benefit of the following patent properties: U.S. provisional patent application Ser. No. 62/068,056, filed on Oct. 24, 2014, the above application is hereby incorporated by reference herein as if set forth in its entirety.

BACKGROUND

1. Technical Field

The present disclosure generally relates to head worn displaying devices, or head mounted displays (HMD), especially to a head worn see-through displaying device employing a reflecting free form curved surface and an image source provided by a large display screen such as generally used in a mobile phone.

2. Description of Related Art

In the prior art, not only a micro displaying module used in a head worn display based on augmented reality (AR) technology is expensive, but also the resolution of the micro displaying module is limited. In addition, in the most of the see-through head worn displaying devices, one reflecting display module only serves a single eye, and it is difficult to achieve a large field of view (FOV) due to a limited aperture or a serious image distortion given large off axis angles. Therefore, more intermediate optical modules are needed to expand the FOV and reduce the distortion, which results in an increase of cost, weight and volume of the HMD. Therefore, it is not convenient for users to wear the head worn see-through display, and the appearance of the head worn display is also affected, let alone few users other than the military can afford such expensive devices.

Therefore, a need exists in the industry to overcome the described problems.

SUMMARY

The purpose of the disclosure is to offer a see-through or full reflection head worn displaying device with a simple structure, a large FOV and light weight to deliver nearly identical reflected images with reduced distortions to both eyes of the user.

In order to solve the problem described above, the disclosure offers a technical proposal as follows.

A head worn displaying device includes a cover such as a hat tongue located ahead of and above the forehead of a user to at least partially shield the stray light from the upper side of the user. The head worn displaying device further includes a holder, such as a clamper set for clamping a mobile phone or a display screen under the rear of the cover, and an optical lens such as a free-form surface mirror is mounted under the front of the cover. The free-form surface mirror comprises a wide concave reflecting surface which is horizontally segmented into a left correction zone, a multiplex zone and a right correction zone, wherein the left correction zone and the right correction zone are continuously connected through the multiplex zone to deliver a continuous reflected left image and a continuous reflected right image at the same time. The multiplex zone is located at the center of the optical lens and is used to partially form a left image and a right image at the same time. The front, rear and horizontal directions may be set in the same way as the human eyes view with the head worn displaying device properly worn.

Preferably, the said optical lens is adjustably mounted under the cover. As a simple example, a sliding groove and a magnetic hinge are located near the front end of the hat tongue. The magnetic hinge slides in the sliding groove to adjust a distance between the display screen of the mobile phone and the optical lens. The optical lens is mounted under the front end of the hat tongue with an adjustable pitch angle by the magnetic hinge. The clamper set is fixed in the rear of the hat tongue. The display screen of the mobile phone and the multiplex zone of the optical lens are configured generally face to face with an adjustable angle to each other, and light rays of the display screen of the mobile phone are projected on the optical lens and then reflected. The optical lens can provide a see-through display function when it optically combines the reflected light rays of the display screen of the mobile phone with the exterior environmental light rays transmitted through the optical lens, and then projects the combined light rays to human eyes to form an augmented reality image.

Preferably, the clamper set comprises an upper clamping portion, a lower clamping portion and a retainer, the mobile phone is clamped between the upper clamping portion and the lower clamping portion by the retainer to ensure the display screen of the mobile phone to face with the multiplex zone of the optical lens.

Preferably, a left magnified virtual image of the display screen is presented to the user's left eye through the left correction zone and the multiplex zone section, without horizontal non-symmetrical image distortion, whereas a right magnified virtual image is presented to the right eye through the right correction zone and the multiplex zone without horizontal non-symmetrical image distortion, simultaneously. Based on the right hand side distortion of the left virtual image caused by the multiplex zone through which the left eye views the right part of the left virtual image, the surface of the left correction zone should be specifically shaped to present a left hand side distortion so that the distorted left virtual image is overall symmetrical about the vertical central axis of the left image. Likewise, based on the left hand side distortion of the right virtual image caused by the multiplex zone, the surface of the right correction zone should be specifically shaped to make the distorted right virtual image to be symmetrical about its vertical axis as well. In general, the horizontal symmetrical distortions give much more comfortable vision experience compared to the previous non-symmetrical distortions, because the left virtual image and the right virtual image have less distortion and are magnified and almost identical compared to the original image on the display screen. In the prior art, however, the skilled people always want to greatly reduce the virtual image distortion by reconstructing the multiplex zone from a simple curved surface but end up with technical conflicts. Serious non-symmetrical distortions can hardly be removed from both left and right images simultaneously by such a reconstructed curved surface, and the huge difference between the two seriously distorted images makes a painful vision experience. For example, if the multiplex zone is shaped particularly to minimize the distortion of the left virtual image, it will simultaneously cause an even more terrible non-symmetrical distortion for the right virtual image, which means identical reflected images can hardly be achieved for both eyes until the present invention is carried out.

Apparently, the disclosed head worn displaying device has a large FOV and deep sense of immersion given a large display screen and near eye magnified virtual images. The simple structure means a light weight and lower costs. Moreover, the invention presents a cost effective solution to deliver identical images with large a large FOV and reduced distortions to both eyes at the same time.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrates the principles of the present embodiments. Moreover, in the drawings, all the views are schematic, and like reference numerals designate corresponding parts throughout several views.

DETAILED DESCRIPTION

Figure 1:
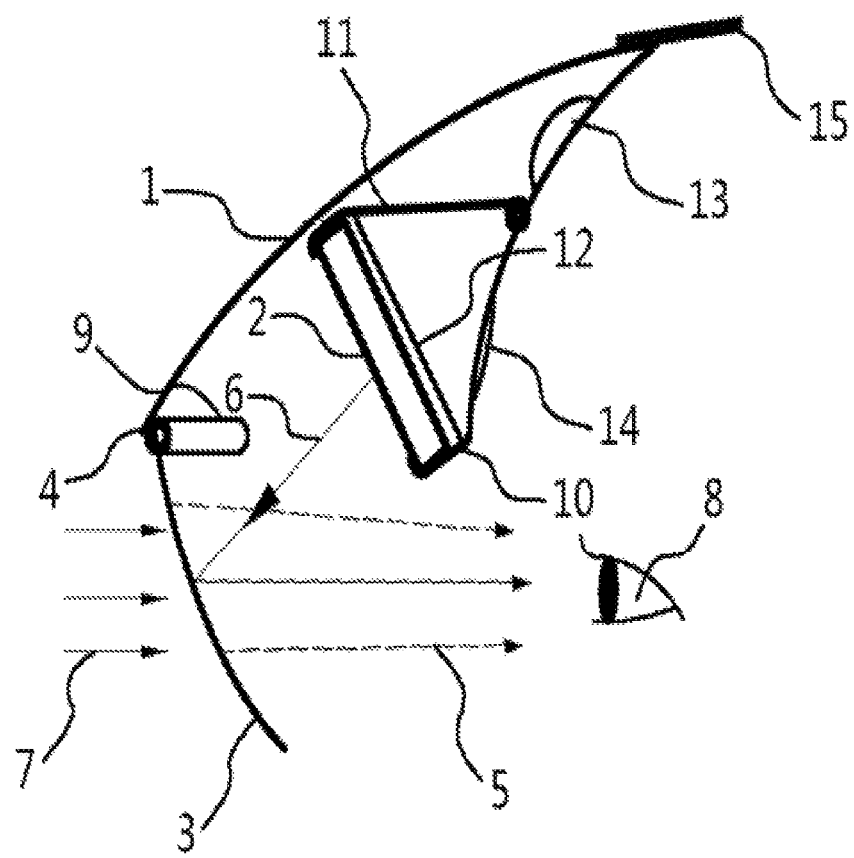
FIG. 1 is a side view of the structure diagram of a head worn see-through displaying device of the disclosure.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

With reference to FIG. 1, the head worn displaying device of the disclosure includes a hat tongue 1 located ahead of the forehead of a user, a clamper set (10, 11, 12) for clamping a mobile phone 2, and an optical lens 3. In some typical embodiments, the display screen 21 of the mobile phone 2 may have a diagonal size of about 3 to 6 inches, and the optical lens 3 may have a height up to 100 mm and a width up to 200 mm to enable a large FOV. In general, the hat tongue 1 may be replaced by any piece of light material that can cover the display screen 21 and at least partially block the stray light from the upper side to make the reflected virtual image comfortable to see. A sliding groove 9 and a magnetic hinge 4 are located at the front end of the hat tongue 1. The magnetic hinge 4 slides in the sliding groove 9 to adjust a distance between a display screen 21 of the mobile phone 2 and the optical lens 3, which is approximately an effective objective distance. In at least one exemplary embodiment, the effective objective distance between the center of the display screen 21 and the center of the optical lens 3 can be about 40 mm to about 100 mm. In a working status, the central eye distance is defined between the center of the optical lens 3 and the midpoint between the user's pupils, and the central eye distance has a preferred range from 40 mm to 100 mm. That is, the magnetic hinge 4 slides in the sliding groove 9 to adjust the central eye distance and the effective objective distance, and to match various interpupillary distances and visual acuities of different users.

The optical lens 3 is mounted under the front end of the hat tongue 1 with an adjustable angle by the magnetic hinge 4, such that the head worn displaying device can match the mobile phones 2 of various sizes, and the virtual image of the display screen 21 of a particular mobile phone 2 can be adjusted to a right position in front of the eyes. The clamper set 10, 11, 12 is fixed in the hat tongue 1, and the fixed display screen 21 has a pitch angle between 60 and 80 degrees, preferred in the range of 65 to 75 degrees, wherein the pitch angle is relative to the horizontal plane. It is easy to understand that an adjustable holder can replace the clamper set 10, 11, 12 to slightly change the pitch angle of the mobile phone 2. In a preferred working mode, the bottom edge of the display screen 21 is about 15 to 40 mm above the human eyes 8, and the pitch angle of the optical lens 3 can be adjusted in the range from 60 to 80 degrees so that the display screen 21 is nearly parallel to the optical lens 3. Imaging rays 6 of the display screen 21 of the mobile phone 2 project on the optical lens 3, and the optical lens 3 optically combines the reflected imaging rays 5 originating from the mobile phone 2 and external environmental light 7 transmitted through the semi-transparent optical lens 3, and then the optical lens 3 projects the combined light to human eyes 8 to form an augmented reality image. The optical lens 3 enables users to see reflected horizontally symmetric virtual images straightly in front that are several times larger than the original images from the display screen 21 of the mobile phone 2, realizing a vision of immersion. As a result, the hat tongue 1 prevents interference from peripheral light. The clamper set (10, 11, 12), the sliding groove 9 and the magnetic hinge 4 can provide a convenient mechanism for the users to adjust a range of visibility and a projection distance according to a physiological regulation of the user.

With reference to FIG. 1, the head worn displaying device further includes a bone conduction microphone 13, a biological electrode 14 and a solar battery 15. The bone conduction microphone 13, the biological electrode 14 and the solar battery 15 are located at a main body of the head worn displaying device. The bone conduction microphone 13 is configured for identifying a sound conducted by a head bone of the user. The biological electrode 14 is configured for taking samples of bio-electricity from the head of the user. As a result, an operation of the head worn displaying device can be controlled by at least one identification signal, such as tooth clicking sound, human brain waves, or myo-electricity generated by grinding teeth or blinking eyes.

The clamper set (10, 11, 12) includes three portions, namely an upper clamping portion 11, a lower clamping portion 10, and a retainer 12 such. In a preferred embodiment, the retainer 12 is a spring. The mobile phone 2 is clamped tightly between the upper clamping portion 11 and the lower clamping portion 10 through the retainer 12, such that the display screen 21 of the mobile phone 2 can keep roughly parallel to the optical lens 3, and the clamper set (10, 11, 12) can fit the mobile phones 2 of various sizes.

Figure 2:
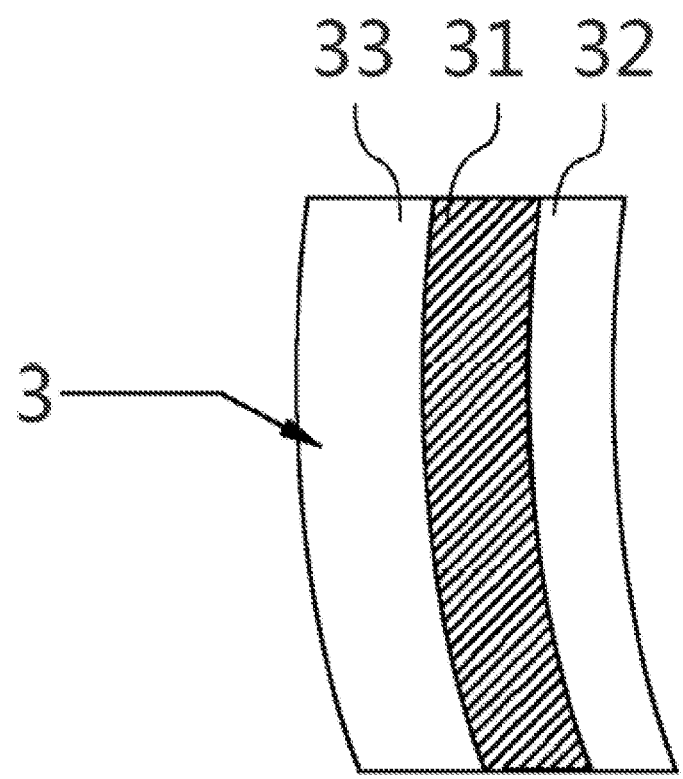
FIG. 2 is a cross-section view of an optical lens of the head worn displaying device shown in FIG. 1.

With reference to FIG. 2, the optical lens 3 can include a transparent substrate 31, a reflective layer 32, and a transmission control layer such as a TFT active liquid crystal layer 33. The transparent substrate 31 is covered with the reflective layer 32 on one surface and the TFT active liquid crystal layer 33 on the other surface.

The transparent substrate 31 has a uniform thickness without diopter, which does not affect external lights transmitted to the eyes 8. Furthermore, the reflective layer 32 is plated on the interior surface of the optical lens 3, and the reflectivity of the reflective layer 32 falls into a preferred range between 40% and 100%. As a result, the optical lens 3 can switch between different features including semi-transparent mirror and total reflection mirror. Therefore, after the optical synthesis of the reflected virtual images and the reality environment images by the optical lens 3, the user achieves augmented reality display effect in the eyes 8.

The TFT active liquid crystal layer 33 is deposited on an external surface of the optical lens 3. The TFT active liquid crystal layer 33 is configured for reducing light for the external environment, which ensures that the interior reflected virtual image is visible. Further, the liquid crystal layer 33 can precisely adjust the transmission rate of each part of the optical lens 3.

Figure 3:
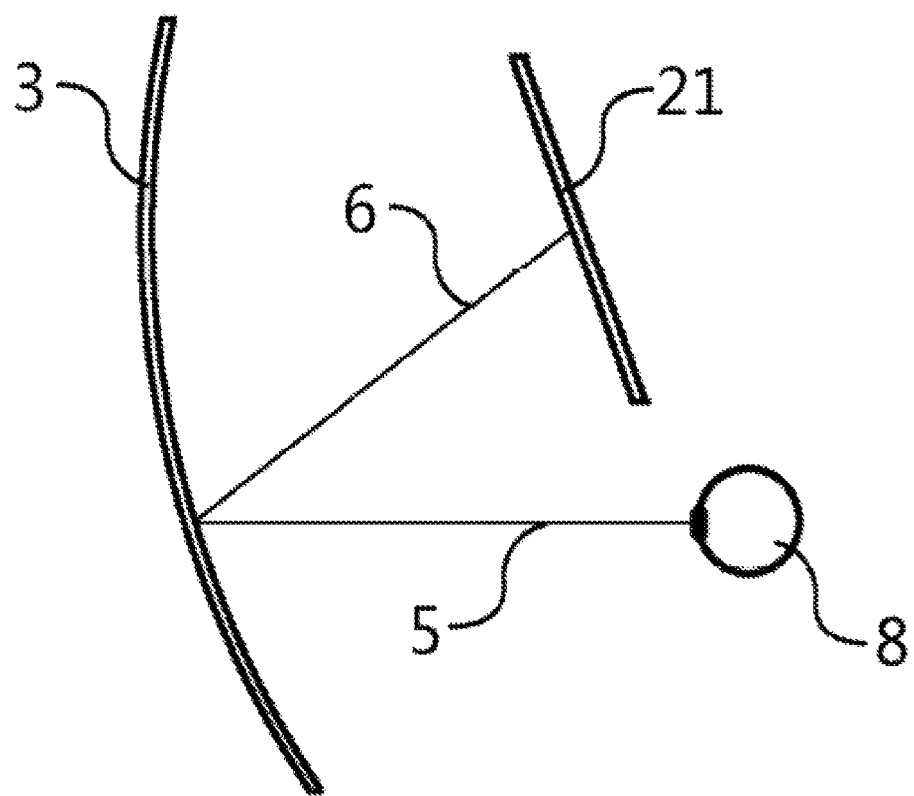
FIG. 3 is a diagram of an alternative embodiment of the head worn displaying device of the disclosure wherein only the reflected image can be seen by the user.

FIG. 3 is a diagram of an alternative embodiment of the head worn displaying device of the disclosure wherein the optical lens 3 is a total reflection mirror, so that only the reflected rays 5 can reach the eyes 8. In this configuration, virtual reality (VR) applications will be easily carried out by a large display screen 21, wherein the large FOV and the simple structure remain advantages over the prior art.

Figure 4:
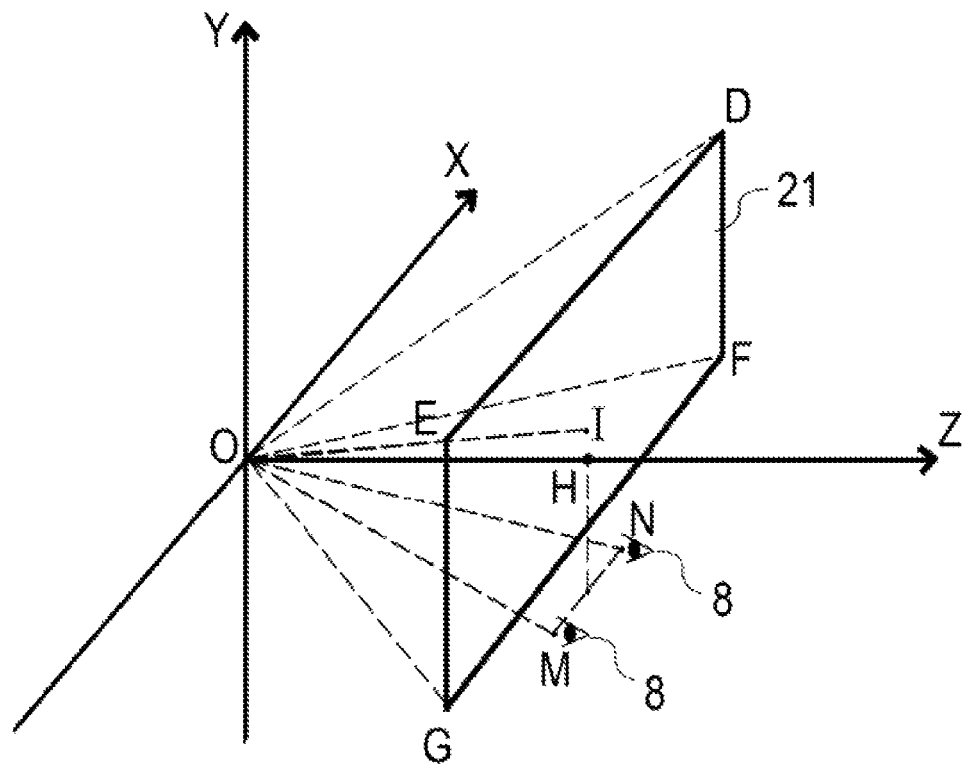
FIG. 4 is a cartesian diagram showing large off axis angles of the display screen and the human eyes relative to the main axis of the optical lens of the disclosure according to another exemplary embodiment.

FIG. 4 is a cartesian diagram showing large off axis angles of the display screen 21 and the human eyes 8 relative to the principal axis of the optical lens 3 of the disclosure according to another exemplary embodiment. Here, the origin is set at the effective center O of the optical lens 3, and Z-axis is perpendicular to the optical lens 3 at the origin. In at least one exemplary embodiment, a rectangular display screen 21 is perpendicular to Z-axis, which means the display screen 21 and the optical lens 3 are nearly parallel to each other. To enable a large FOV and a sense of immersion, a typical size of the display screen 21 can be as large as 120 mm times 60 mm, and its four apexes D, E, F, and G have large distances from Z-axis. The points M and N indicate the pupils of the eyes 8, respectively, and the line segment MN indicates a pupil distance which is assumed to be a typical value of 60 mm. Usually, the optical lens 3 is symmetrical about X-axis and Y-axis, and the segment MN is parallel to both X-axis and the bottom edge FG of the display screen 21. As a simple approximation, the segment MN and the display screen 21 are in the same plane which is 80 mm from the origin, and the segment MN is 30 mm below the bottom edge FG which is 20 mm below the X-Z plane. That means the Z-intercept point H of the display screen 21 will determine its Z-intercept to be 80 mm, and the center I of the display screen 21 has to be some distance above Z-axis so as to accommodate such a large flat screen right above the user's forehead as shown in FIG. 1. The Z-intercept OH of the display screen 21 is taken as an effective objective distance between the display screen 21 and the effective center O of the optical lens 3, which has a preferred range from 40 mm to 100 mm roughly. The off axis angle of a point relative to the optical lens 3 can be calculated from the origin and Z-axis, and a wide range of off axis angles will cause a serious challenge of optical design. Therefore, the range of off axis angles associated with the display screen 21 can be represented by the corresponding off axis angles of the four apexes D, E, F, and G, which are determined to be about 42° for ∠DOH and ∠EOH, and about 38° for ∠FOH and ∠GOH. Likewise, the viewing angle difference between the two eyes 8 can be calculated using the off axis angles of the eyes 8 which are determined to be about 36° for ∠MOH and ∠NOH.

Figure 5:
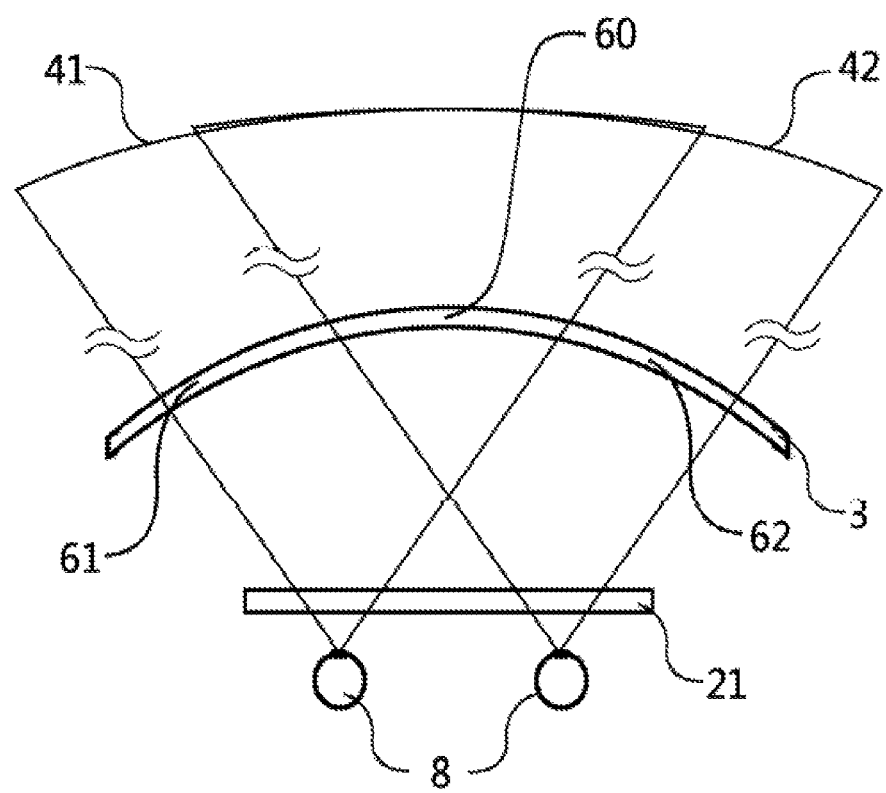
FIG. 5 is a top view of another embodiment showing three segments of the optical lens that reflect different images from the display screen to the left eye and the right eye, respectively.

As shown in FIG. 5 in general, the left eye receives the left reflected image 41 and the right eye simultaneously receives the right reflected image 42 through three segments of the optical lens 3, including a multiplex zone 60, a left correction zone 61, and a right correction zone 62, where the left correction zone 61 and the right correction zone 62 are connected by the multiplex zone 60. To make a sense of immersion, the total horizontal width of the three segments is preferred in a range from 120 mm to 200 mm.

In the prior art, a precisely designed free form lens can deliver a perfect image for a source object with a serious off axis effect to a single eye. At the same time, however, such a preset free form lens will cause serious distortion for the image viewed by the other eye due to a big view angle difference between the two eyes. Otherwise, a typical lens 3 of the prior art will present differently distorted images 41 and 42 due to very different off axis reflection for the user's eyes 8, where the left image 41 and the right image 42 usually have different non-symmetrical distortions. When the magnification rate of the reflected images 41 and 42 is increased, the non-symmetrical distortion will increase as well. That means, the left image 41 and the right image 42 can hardly get overlapped or matched with each other through the visional processing by the user's brain. The large visional difference and image distortions for the two eyes may give tiring or harmful experience to the user. Therefore, a specially designed optical lens 3 is invented to deliver identical reflected images with minimum distortion to both eyes 8.

Figure 6:
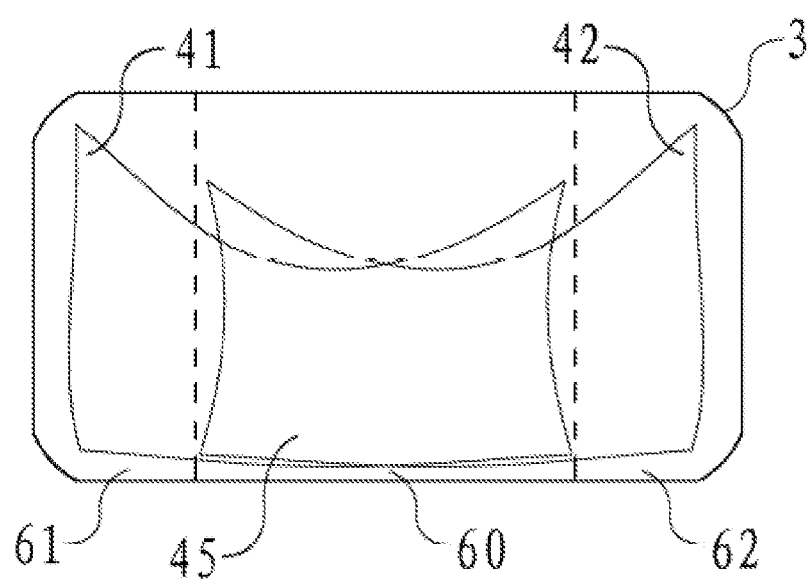
FIG. 6 is a rear view of the three segments of the optical lens of the prior art that reflects the images with non-symmetrical distortions to the left eye and the right eye, respectively.

To decrease the non-symmetrical image distortion caused by the large off axis reflection, free form design optimization is carried out for the three segments of the optical lens 3 as shown in FIG. 6. The left image 41 falls into the left correction zone 61 and the multiplex zone 60, and the right image 42 falls into the right correction zone 62 and the multiplex zone 60, which means the left image 41 and the right image 42 are almost physically overlapped within the multiplex zone 60. In general, the multiplex zone 60 needs less optimization than the left correction zone 61 and the right correction zone 62, so that optimizing the left correction zone 61 and the right correction zone 62 can make the left image 41 and the right image 42 very close to symmetrical distortion, respectively.

Figure 7A:
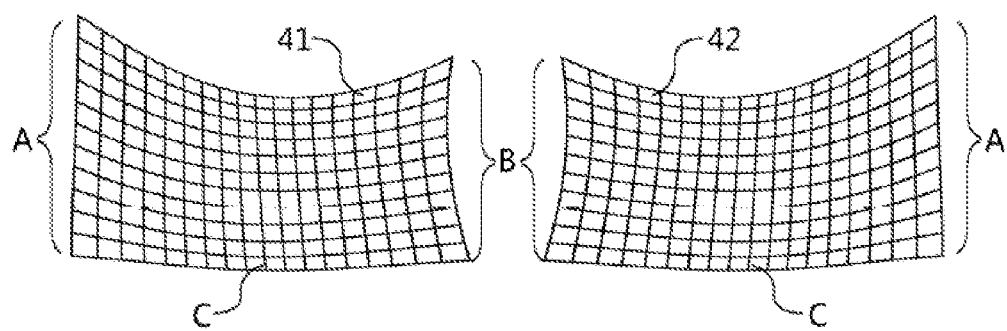
FIGS. 7(a) and 7(b) are an isometric view of a change from non-symmetrical distortion to symmetrical distortion of the reflected images as the segmented free form surface of the head worn displaying device is optimized.

Non-symmetrical distortions of the left image 41 and the right image 42 without the design optimization are shown in FIG. 7(a), wherein the periphery of each image corresponds to the periphery of the display screen 21. The reflected images 41 and 42 usually have a greater magnification rate near the vertical sides than in the middle, the left image 41 has a greater magnification at the left hand side than at the right hand side, and the right image 42 has a greater magnification at the right hand side than at the left hand side. To measure the horizontal non-symmetry of the left image 41, its non-symmetry index is defined as $(A-B)/2C$, where A, B, and C are the height of the left image 41 at the left side, the middle and the right side. In the prior art, the non-symmetry index of a lens is usually beyond 10% and may be as large as 30% for the worst cases. If the multiplex zone 60 is significantly modified to decrease the non-symmetry index for the left image 41, then the non-symmetry index of the right image immediately gets worse, and vice versa. Any modification to the multiplex zone 60 will change the multiplex part 45 of the left image 41 and the right image 42 simultaneously but in an opposite way.

In the prior art, however, the skilled people always want to greatly reduce the virtual image distortion by reconstructing the multiplex zone 60 from a simple curved surface but end up with technical conflicts. Serious non-symmetrical distortions of both left and right images are caused by a simple curved surface, and the huge mismatch between the two seriously distorted images makes a painful experience of vision difference. If the multiplex zone is shaped only to minimize the distortion of the left virtual image 41, it will simultaneously cause an even more terrible non-symmetrical distortion for the right virtual image 42, which means no identical views can be achieved for both eyes until the present invention is carried out.

To cope with such a technical conflict, the current invention applies an optimized left correction zone 61 so as to shrink the high magnification side of the left image 41 and an optimized right correction zone 62 to shrink the high magnification side of the left image 41, in which way the non-symmetry index can be decreased down to 5% or less for the left image 41 and the right image 42, simultaneously. Based on the right hand side distortion of the left virtual image 41 delivered through the multiplex zone 60 to the left eye, the reflective surface of the left correction zone 61 can be specifically shaped so that the left hand side distortion of the left virtual image 41 becomes approximately symmetrical with its right hand side distortion. Likewise, based on the left hand side distortion of the right virtual image 42 delivered through the multiplex zone 60, the reflective surface of the right correction zone 62 can be specifically shaped to make the distorted right virtual image 42 become approximately symmetrical about it vertical central axis as well. In general, the horizontal symmetrical distortions give much better vision compared to the previous non-symmetrical distortions. As a result, the left virtual image 41 and the right virtual image 42 have almost identical distortion against the original image on the display screen 21, enabling identical magnified virtual images seen in both eyes 8 more comfortably.

Figure 7B:
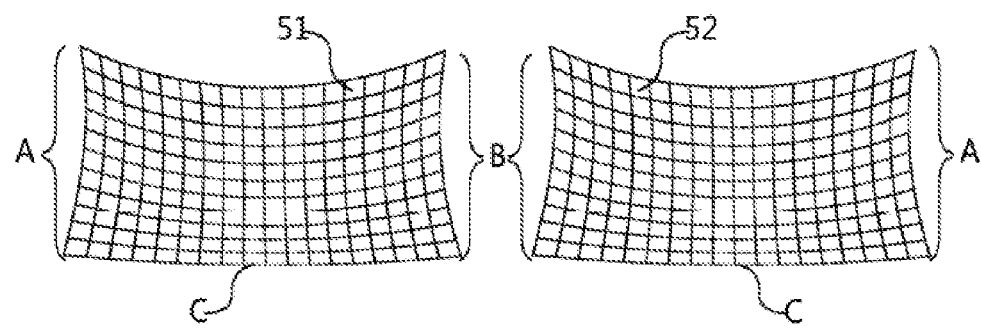
Figure 8:
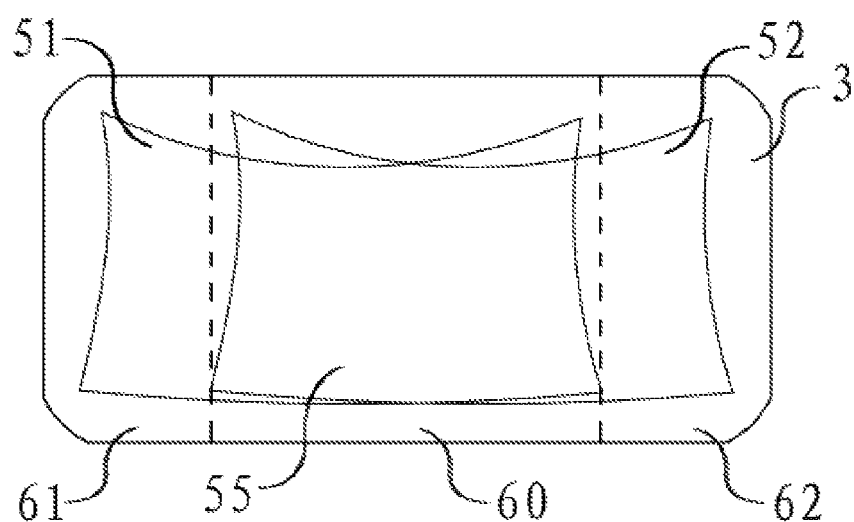
FIG. 8 is a rear view of an optimized optical lens that reflects nearly identical images with symmetrical distortion to the left eye and the right eye, respectively.

In each optimization process, common tools and simulation software of the prior art can be used to reconstruct the local curvature of an individual segment of the optical lens 3 step by step while tracking the change of image distortion. The optimized optical lens 3 can achieve nearly identical left image 51 and right image 52 with symmetrical horizontal distortion, as shown in FIG. 7(*b*), making much more comfortable vision experience for the user. The optimized optical lens 3 presents the corrected left side of the left image 51 and the corrected right side of the right image 52, where the multiplex zone 60 undergoes slight modification to remain the multiplex part 55 of the reflected images almost unchanged, as shown in FIG. 8.

When enabling a FOV from 60° to 120°, some embodiments can remain minimum distortion for the reflected virtual images with a magnification rate in a range from 1.5 to 5 depending upon the size of the display screen 21. Preferably, the optical lens s is designed for a magnification rate in a range of 2 to 4 to achieve a FOV above 80°.

In another preferred embodiment, the flat display screen can be replaced with a flexible display screen which can be bent around the user's forehead to conform to the curved optical lens 3. The segments of the optical lens 3 can be designed according to the bent shape of the flexible screen, and the extreme non-symmetrical distortion can be minimized at once. Therefore, a perfect horizontal symmetrical distortion or no distortion can be easier to realize.

Figure 9A:
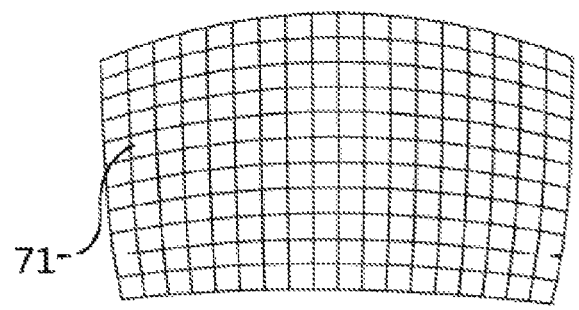
FIGS. 9(a) and 9(b) are an isometric view of a comparison between a pre-distorted image generated by the display screen and a restored image reflected by the optical lens of another embodiment of the disclosure.
Figure 9B:
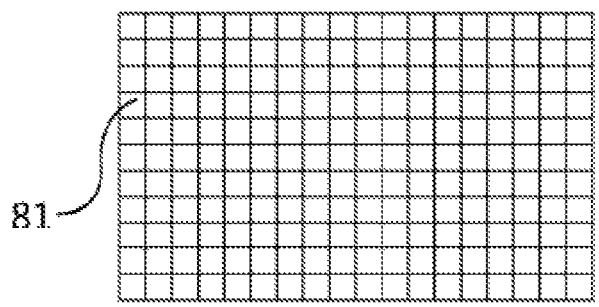

In another preferred embodiment, a head worn display device further comprises an image correction module to invert or pre-distort the source image 71 on the display screen, as shown in FIG. 9(*a*). The counter-action processed by an image correction program can decrease the vertical distortion of the horizontal symmetrical images shown in FIG. 7(*b*) and FIG. 8, and finally the optical lens 3 reflected a regular image 81 without distortion as shown in FIG. 9(*b*). That further improves the vision experience for the user.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A head worn displaying device, comprising an optical lens, a display screen and a cover which being located ahead of the forehead when the head worn displaying device being worn by a user, further comprising a holder for mounting the display screen under a rear of the cover, wherein the optical lens is mounted under the front of the cover to directly reflect a source image from the display screen, wherein the optical lens comprises a concave reflecting surface which is horizontally segmented into a left correction zone, a multiplex zone and a right correction zone, wherein the left correction zone and the right correction zone are connected through the multiplex zone to deliver continuous reflected images, wherein the left correction zone and the multiplex zone are able to deliver a continuous magnified left virtual image to the user's left eye with reduced horizontal non-symmetrical image distortion and at the same time the right correction zone and the multiplex zone are able to deliver a continuous magnified right virtual image to the user's right eye with reduced horizontal non-symmetrical image distortion, wherein the reflected left image and the reflected right image are nearly identical; wherein a reflective surface of the left correction zone is shaped such that a left hand side distortion of the left virtual image becomes basically symmetrical with a right hand side distortion of the left virtual image, and a reflective surface of the right correction zone is shaped such that a right hand side distortion of the right virtual image becomes basically symmetrical with a left hand side distortion of the right virtual image; the optical lens is adjustably mounted under the front end of the cover through a sliding groove and a magnetic hinge located near the front end of the cover, wherein the magnetic hinge slides in the sliding groove to adjust an angle and a distance between the display screen and the multiplex zone.

2. The head worn displaying device of claim 1, wherein the display screen is previously integrated in a mobile phone and the holder is a clamper set comprising an upper clamping portion, a lower clamping portion and a retainer, wherein the mobile phone is clamped between the upper clamping portion and the lower clamping portion by the retainer to ensure the display screen of the mobile phone to match with the center of the optical lens.

3. The head worn displaying device of claim 1, wherein an angle between the display screen and the horizontal plane is about 600 to 800 and the angle between the multiplex zone and the horizontal plane is about 600 to 800.

4. The head worn displaying device of claim 3, wherein the display screen and the multiplex zone are configured nearly parallel to each other, and the angle between the display screen and the horizontal plane is about 65° to 75°.

5. The head worn displaying device of claim 1, wherein the optical lens delivers a see-through augmented reality image when the optical lens optically combines the reflected light rays of the display screen with the exterior environmental light rays transmitted through the optical lens, or delivers a fully reflected virtual image when the optical lens only reflects the light rays from the display screen.

6. The head worn displaying device of claim 1, wherein a distance between the center of the display screen and the center of the optical lens is about 40 mm to 100 mm.

7. The head worn displaying device of claim 1, wherein a distance between the user's eyes and a bottom edge of the display screen is about 10 mm to 35 mm when the said bottom edge nearly reaches the user's forehead.

8. The head worn displaying device of claim 1, wherein a thickness of the optical lens is uniform without diopter, and the optical lens does not affect the external light rays transmitted to the eyes.

9. The head worn displaying device of claim 1, wherein an optical reflective layer is plated on the concave surface of the optical lens, and the reflectivity or the transmission rate of the optical reflective layer falls into a range from 40% to 100%.

10. The head worn displaying device of claim 9, wherein a TFT active liquid crystal layer is located on an external surface of the optical lens, and the TFT active liquid crystal layer is adjusted to reduce the light rays from for the external environment.

11. The head worn displaying device of claim 1, further comprises a program to invert or pre-distort the source image on the display screen.

12. The head worn displaying device of claim 1, where the display screen is flexible which conforms to the curvature of the optical lens and is bent around the user's forehead.

13. The head worn displaying device of claim 1, wherein the optical lens delivers virtual images at a magnification rate in the range from 1.5 to 5.

14. The head worn displaying device of claim 1, wherein the optical lens delivers virtual images at a FOV from 60° to 120°.

15. The head worn displaying device of claim 1, wherein the optical lens delivers virtual images at a magnification rate in the range from 2 to 4 and a FOV above 80°.

16. The head worn displaying device of claim 1, wherein a total horizontal width of the three segments of the optical lens is in a range from 120 mm to 200 mm.

17. A head worn displaying device, comprising an optical lens, a display screen and a cover which being located ahead of the forehead when the head worn displaying device being worn by a user, further comprising a holder for mounting the display screen under a rear of the cover, wherein the optical lens is mounted under the front of the cover to directly reflect a source image from the display screen; wherein the optical lens comprises a concave reflecting surface which is horizontally segmented into a left correction zone, a multiplex zone and a right correction zone; wherein the left correction zone and the right correction zone are connected through the multiplex zone to deliver continuous reflected images; wherein the left correction zone and the multiplex zone are able to deliver a continuous magnified left virtual image to the user's left eye with reduced horizontal non-symmetrical image distortion and at the same time the right correction zone and the multiplex zone are able to deliver a continuous magnified right virtual image to the user's right eye with reduced horizontal non-symmetrical image distortion; wherein the reflected left image and the reflected right image are nearly identical; wherein the optical lens is adjustably mounted under the front end of the cover through a sliding groove and a magnetic hinge located near the front end of the cover; wherein the magnetic hinge slides in the sliding groove to adjust an angle and a distance between the display screen and the multiplex zone.

18. The head worn displaying device of claim 17, wherein an angle between the display screen and the horizontal plane is about 60° to 80° and the angle between the multiplex zone and the horizontal plane is about 60° to 80°.

19. The head worn displaying device of claim 18, wherein the display screen and the multiplex zone are configured nearly parallel to each other, and the angle between the display screen and the horizontal plane is about 65° to 75°.

* * * * *